United States Patent [19]

Bergman

[11] 4,174,828
[45] Nov. 20, 1979

[54] BAYONET CLAMPING APPARATUS FOR MACHINE TOOLS

[76] Inventor: Raymond A. Bergman, Minster, Ohio

[21] Appl. No.: 829,358

[22] Filed: Aug. 31, 1977

Related U.S. Application Data

[63] Continuation-in-part of Ser. No. 684,725, May 10, 1976, Pat. No. 4,058,885.

[51] Int. Cl.² ............................................. B23Q 7/00
[52] U.S. Cl. ....................................... 269/34; 269/20; 269/94; 269/157; 269/241
[58] Field of Search ....................... 269/20, 27, 32, 91, 269/93-94, 34, 157, 241

[56] References Cited

U.S. PATENT DOCUMENTS

| | | | |
|---|---|---|---|
| 2,421,957 | 6/1947 | Mead | 269/94 |
| 2,428,111 | 9/1947 | Eldrup | 269/93 |
| 3,055,654 | 9/1962 | Harrison et al. | 269/241 |
| 3,209,623 | 10/1965 | Schardt | 269/20 X |

*Primary Examiner*—Robert C. Watson
*Attorney, Agent, or Firm*—Albert L. Jeffers; John F. Hoffman

[57] ABSTRACT

Apparatus for clamping a workpiece or workpiece fixture in a machine tool comprising pin-type clamping elements which are insertable into the work table and engage with locking elements mounted therein. More specifically, the table has a surface adapted to support a workpiece or fixture which includes a plurality of openings and removable covers thereon to prevent chips and other debris from collecting in the openings and to prevent the loss of pneumatic pressure in machine tables of the air float type. The clamping apparatus comprises a hydraulically actuated piston mounted within the table having a central bore with means for releasably retaining one end of a locking pin. The locking pin is adapted to be inserted into the bore and in one embodiment is provided with high pitch threads which are engageable with mating threads in the piston bore. In another embodiment, the pin is dimensioned to be inserted through the piston bore and then locked to the piston by means of lugs which are brought into locking engagement with the piston by a quarter turn of the pin. A clamp bar may be secured to the top of the pin by a threaded nut and suspended between a support block and the workpiece or fixture so that when the piston is actuated, the clamping bar will be drawn toward the table as the pin is retracted and by this means will exert downward clamping pressure on the workpiece or fixture. A plurality of similar hydraulic pistons may be distributed throughout the table so that clamping pins may be inserted at a variety of positions thereby enabling clamping pressure to be applied to the workpiece or fixture at any point desired.

14 Claims, 15 Drawing Figures

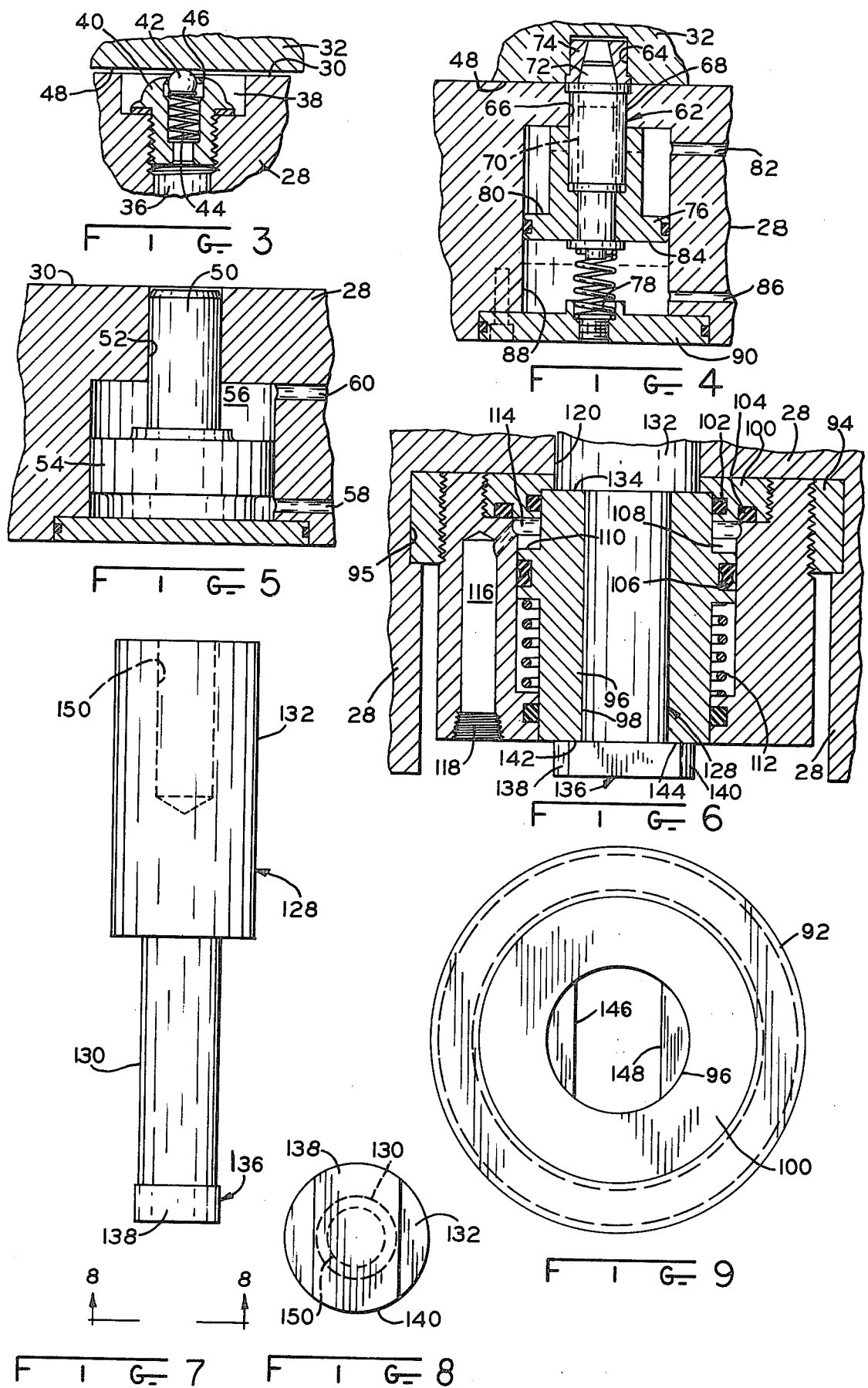

BAYONET CLAMPING APPARATUS FOR MACHINE TOOLS

CROSS REFERENCE TO RELATED APPLICATIONS

This is a continuation-in-part of application Ser. No. 684,725 filed May 10, 1976 which is now U.S. Pat. No. 4,058,885.

BACKGROUND OF THE INVENTION

The present invention relates to a clamping system for clamping a workpiece or workpiece fixture to the supporting table of a machine tool, and in particular to a bayonet clamping system which is suitable for use with work tables when the fixture is floatingly supported on a film of pressurized air during movement from one machining position to another.

Whenever a workpiece is machined, it must be accurately positioned on the work table in proper spatial relationship to the cutting tool. Since the tool will exert considerable force on the workpiece during machining, it is also necessary that it be securely anchored or clamped in the desired position. Heretofore, work tables have been provided with T-slots normally running the entire length of the table and adapted to receive T-bolts or other fastening elements which engage clamping bars or the like for the purpose of clamping the workpiece to the table. A serious drawback to this arrangement is that considerable amounts of chips, shavings, and other debris produced during machining collect in the T-slots and frequent table clean-up by the operator is necessary.

An even more serious problem exists in work tables of the type wherein the fixture is supported for movement on a film of pressurized air. A work table of this type is shown and described in the above-identified patent and is designed to eliminate the time consuming, laborious positioning of the workpiece or fixture in the machine tool as various regions of the workpiece are to be machined. In this apparatus, the table has passages therein which supply fluid under pressure between the downwardly facing surface of the fixture and the upwardly facing horizontal surface of the table so that the fixture "floats" on the film of air and can be moved about easily on the table. Cooperating elements of pin and socket locating devices on the fixture and table provide for the accurate locating of the fixture in predetermined positions on the table.

It is necessary, however, to clamp the fixture to the table so that it will not move during positioning. Heretofore, T-slots have been used for clamping the fixture but, due to the fact that they extend underneath the fixture itself, leakage of pneumatic pressure from the film of air has resulted. This increases the pneumatic pressure which is necessary to support the workpiece. Furthermore, much of the benefits of being able to rapidly reposition the workpiece are never realized due to the cumbersome clamping operation which is necessary prior to machining.

SUMMARY OF THE INVENTION

The present invention overcomes the problems and disadvantages of the prior art by providing a plurality of openings distributed over the table surface into which clamping elements are insertable and locked therein by a relatively simple motion. By selecting the appropriate openings for insertion of the clamping elements, clamping pressure may be applied at any desired position on the table. In one embodiment, automatic clamping is effected by a hydraulic piston and cylinder mounted within the table and engageable with the locking pin to draw it downwardly and exert clamping pressure when actuated. In another embodiment, automatic clamping is effected by a hydraulic cylinder mounted toward the top of the clamping elements and exerts a downward pressure when actuated.

Specifically, the present invention is concerned with apparatus for clamping a workpiece or workpiece fixture in a machine tool comprising: a table having a surface adapted to support a workpiece or workpiece fixture thereon, a plurality of openings in a table having removable cover means thereover, a plurality of first clamp elements being mounted within the table below and accessible through the openings, a second clamp element adapted to be removably inserted in any of the openings and including means for selectively mechanically interlocking with the first element mounted below the opening in which the second element is inserted, a third element on the second clamp element adapted to engage a workpiece or workpiece fixture supported on the table surface, and means for drawing the third element toward the table surface whereby a workpiece or fixture supported on the table and engaged by the third element will be clamped therebetween.

It is an object of the present invention to provide a bayonet clamping system for machine tools including a plurality of female clamp elements which are distributed throughout the table and accessible through openings in the table surface so that one or more male clamp elements may be inserted through selected ones of the openings and engaged with the female element positioned thereunder by a simple twisting motion.

Another object of the present invention is to provide a bayonet clamping system for machine tools wherein clamping pressure at a wide variety of positions on the table may be applied.

A further object of the present invention is to provide a bayonet clamping system for machine tools having tables of the air float type wherein the table may be formed without T-slots thereby enabling lower pneumatic pressures. For example, heavy loads can be lifted 0.007 in. with as little as 20 psi of pneumatic pressure.

A further object of the present invention is to provide a bayonet clamping system for machine tools enabling a relatively smooth and uninterrupted table work surface.

A still further object of the present invention is to provide a bayonet clamping system for machine tools which reduces machine down time for purposes of clearing chips and shavings out of the T-slots, as is necessary to existing work tables.

Yet another object of the present invention is to provide a bayonet clamping system wherein clamping pressure may be exerted automatically by means of fluid actuators.

BRIEF DESCRIPTION OF THE DRAWINGS

The exact nature of the present invention will become more apparent upon reference to the detailed description taken in conjunction with the accompanying drawings in which:

FIG. 3 is a sectional view of one of the valved connections leading from a passage in the table to the surface on which the workpiece fixture is supported;

FIG. 4 is a sectional view of one of the locating pins shown engaged with a corresponding socket in the lower surface of the workpiece fixture;

FIG. 5 is a sectional view of a retractable centering pin;

FIG. 6 is a sectional view of one of the hydraulic actuators of FIG. 1 taken along line 6—6;

FIG. 7 is a side elevational view of one of the male clamping elements;

FIG. 8 is an end view of the male clamping element shown in FIG. 7;

FIG. 9 is a top plan view of the hydraulic actuator shown in FIG. 6 with the pin removed;

DETAILED DESCRIPTION

Figure 1:
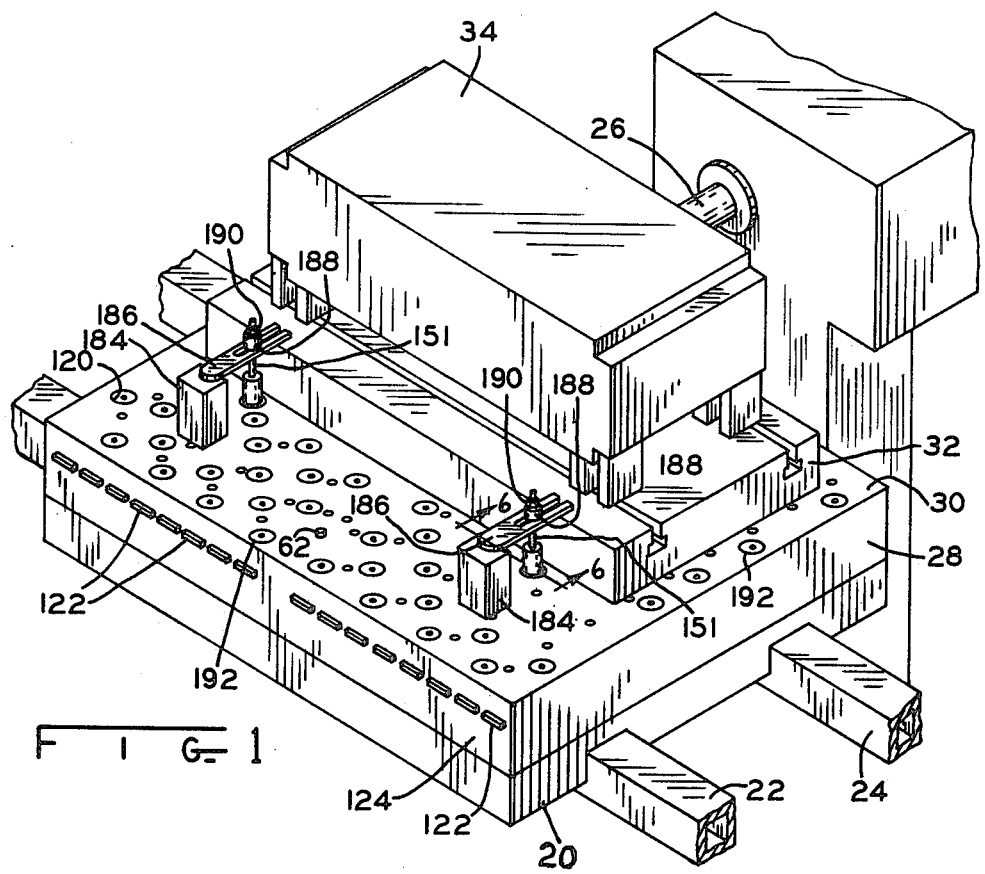
FIG. 1 is a perspective view of a machine tool wherein the supporting table is provided with a bayonet clamping system according to the present invention.

Referring now to the drawings, FIG. 1 is a perspective view of a machine tool having a bed 20 supported on ways 22 and 24 and a working tool 26, which may be a boring tool, milling tool or the like according to well known practice in the machine tool art. A table or plate 28 is fixedly secured to bed 20 and includes an upper surface 30 on which is supported a workpiece fixture 32 having a workpiece 34 mounted thereon.

Figure 2:
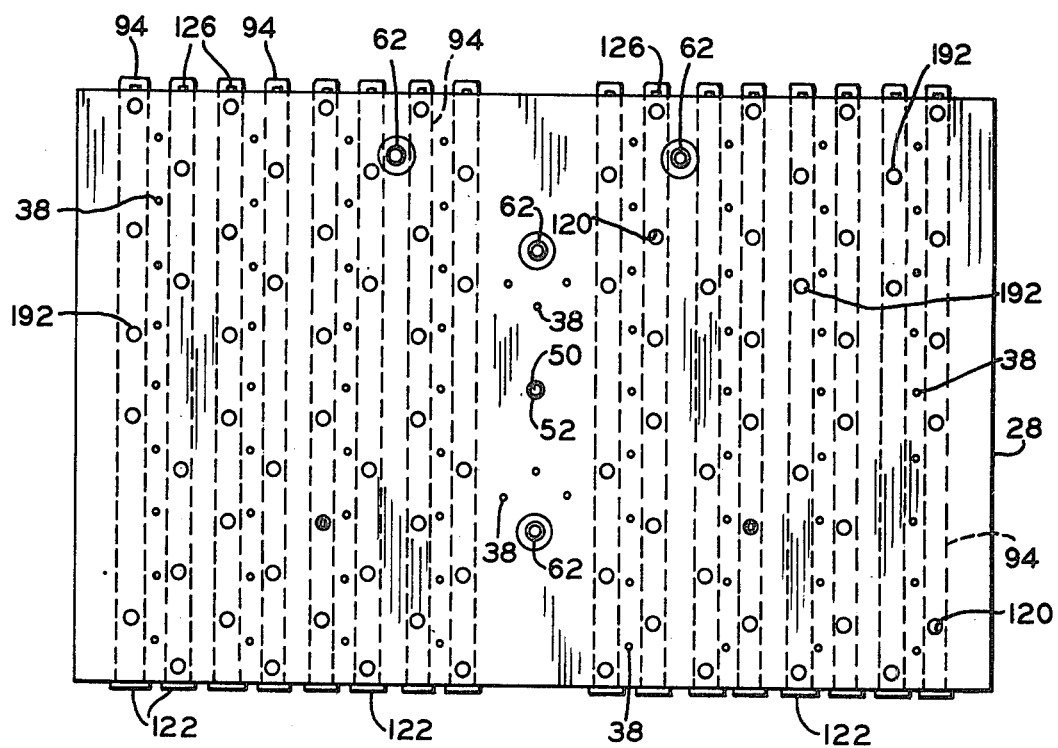
FIG. 2 is a top plan view of the table shown in FIG. 1.

Table 28 is provided with a plurality of fluid passageways 36 (FIG. 3) which are connected via a control valve (not shown) with a supply of fluid under pressure. The fluid under pressure is preferably air, but could conceivably comprise another fluid medium. Passageways 36 extend upwardly through table 28 and communicate with opening 38 in the surface 30 of table 28. As shown in FIGS. 1 and 2, there are many such openings 38 distributed over the table surface 30 so as to provide a film of pressurized air wherever the fixture 32 is positioned. The upper end of each passageway is closed by a valve comprising a body 40 which may be threaded into passageway 36 and the top of which is disposed slightly below the level of table surface 30. Valve body 40 is tubular and has captured therein a valve ball 42 which projects slightly above the surface 30 of table 28 as shown in FIG. 3. A spring 44 urges ball 42 into its upper closed position in which it contacts circular valve seat 46.

When the fixture 32 is moved on table 28 and the downwardly facing surface 48 of fixture 32 engages ball 42, the ball 42 will be depressed as shown in FIG. 3 and admit air under pressure from passageway 36, between seat 46 and ball 42 to the space between surfaces 48 and 30. The pressure of the fluid is so adjusted that a fluid film will be established which will floatingly support fixture 32 thereon. This enables the fixture to be easily moved about on table 28 to the desired position. Obviously, when the supply of fluid is terminated, fixture 32 will come to rest directly on table surface 30. Each opening 38 includes a valve identical to that shown in FIG. 3. If desired, the fixture supporting pneumatic pressure could be supplied from the bottom of the fixture itself rather than from the table.

It is essential that the workpiece 34 be accurately located for machining, and to this end, table 28 includes a main centering pin 50 (FIG. 5) reciprocably received within a bore 52 in table surface 30. Integrally formed with pin 50 is a piston 54 reciprocably received within chamber 56 and which is actuated by means of fluid pressure applied through passageways 58 and 60. Fixture 32 is provided with a downwardly opening bore (not shown) which receives centering pin 50 when the same is extended to its upper position above the surface 30 of table 28. Alternatively, a slot (not shown) in the lower surface 48 of fixture 32 may be provided so as to enable translation of fixture 32. When the fixture 32 is introduced into the machine, it is set down on table 28 with the pin 50 received in the corresponding bore or slot in fixture 32. When the fluid pressure film is established between the fixture 32 and table 28, fixture 32 can rotate freely about the axis of pin 50 and, in the case where a slot is provided in fixture 32, both translation and rotation are possible.

In addition to pivot pin 50, there are additional locating pins 62 which serve to accurately locate the fixture in various predetermined positions. The locating pins 62 are located in precise positions on table 28 with reference to the tool 26. These pins 62 are engageable with sockets 64 provided in the bottom surface 48 of fixture 32 and which are also accurately located within the fixtures 32 with reference to the location of pins 62. Thus, when one or more pins 62 engage the corresponding sockets 64 in the bottom of the fixture 32, the fixture 32 will be in an accurately located position on the table 28. When the centering pin 50 engages the fixture, only one of locating pins 62 is required to determine fixture location. Alternatively, two locating pins 62 could be employed and the fixture location determined thereby without depending on pivot pin 50.

Table 28 is provided with bores 66 each of which at the upper end thereof has an elongated bushing 68. Pin 70, having a tapered upper end 72 adapted for seating in the correspondingly tapered bushing 74 in socket 64, is slidably received in bushing 68. At the lower end thereof, pin 70 is connected with a double acting piston 76 biased upwardly by spring 78 to the position shown in FIG. 4. Each piston 76 has an upwardly facing fluid surface 80 adapted to be acted on by fluid from passageway 82 to drive the piston 76 and pin 70 downwardly until the upper end 72 of the pin is below the upper surface 30 of table 28. Alternatively, a supply of fluid pressure to the downwardly facing surface 84 from passageway 86 will drive piston 76 upwardly to effect firm engagement of the tapered end 32 with bushing 74. The lower end of bore 88 is closed by cover plate 90. As shown in FIG. 2, table 28 is provided with a number of locating pins 62 so that a number of successive machining positions of workpiece 34 and fixture 32 may be realized.

By supplying air under pressure to the upper side 80 of piston 76, pin 70 will be moved downwardly out of bushing 74. If fluid under pressure is then introduced between fixture 32 and table 28, fixture 32 may be moved to the desired position. With the fixture 32 in this position, pneumatic pressure is vented from passageway 82 and pin 70 will move upwardly under the pressure of spring 78 until its tapered portion 72 engages bushing 74. Pin 70 may be driven with more force into bushing 74 by admitting pressure through conduit 86. With the fixture 32 accurately located in this manner, the supply of pneumatic pressure between fixture 32 and table 28 is then terminated and fixture 32 will come to rest on surface 30. Additional details relating to the air float table described herein may be found in the previously identified U.S. Pat. No. 4,058,885.

One embodiment of the present invention is illustrated in FIGS. 6, 7, 8, 9 and 10. It comprises a hydraulic cylinder 92 threadedly secured to an elongated plate 94 which is slidably received within elongated slots in table 28. A specially designed piston 96 is reciprocably received within cylinder 92 and has an elongated opening 98 extending therethrough. Bushing 100 is threadedly secured to piston 92 and sealed against piston 96 and cylinder 92 by means of O-rings 102 and 104, respectively. Seal 106 seals the other end of working chamber 108 which is defined on one end by annular piston face 110 and on the other end by housing 100. Piston 96 is urged to its upper position (FIG. 6) by spring 112 and is retracted to its lower position when fluid under pressure, either hydraulic or pneumatic, is admitted to working chamber 108 through passageways 114 and 116. Port 118 is adapted to be connected to a source of fluid under pressure through any suitable conduit (not shown).

Cylinders 92 and their respective pistons 96 are located beneath openings 120 in table surface 30. Any desired number of openings 120 and piston and cylinders 96, 98 may be provided but it is preferable that there be a sufficient number to permit clamping at any desired position on the table surface 30. Cylinders 92 are accurately positioned underneath their respective openings 120 by plates 94 which slide into T-slots 95 until their ends 122, which are wider than slots 95, abut the side 124 of table 28. Any suitable means such as tapered pins 126, may be employed for locking plates 94 in their respective T-slots 95.

The male clamping element comprises a pin 128 (FIGS. 7 and 8) having a shank portion 130 adapted to be inserted through the opening or bore 98 of piston 96, an enlarged head 132 which is dimensioned to be received within opening 120 and abut annular shoulder 134, and a locking portion 136 having a pair of lugs or ears 138 and 140. Locking portion 136 is dimensioned to pass through piston bore 98 when lugs 138 and 140 are aligned with the longitudinal dimension of bore 98. When pin 128 is rotated a quarter turn about its axis, however, lugs 138 and 140 are positioned to positively lock pin 128 in piston 96 (FIG. 6). As shown in FIG. 9, bore 98 is somewhat elongated in the horizontal direction and the downwardly facing surfaces 142 and 144 of piston 96 will abut lugs 138 and 140 when pin 128 is rotated a quarter turn. The head 132 of pin 128 is provided with a threaded socket 150 adapted to receive a suitably threaded bolt or rod 151 for the purpose described below.

Figure 12:
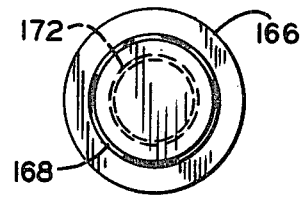
FIG. 12 is an end view of the male clamp element shown in FIG. 11.
Figure 11:
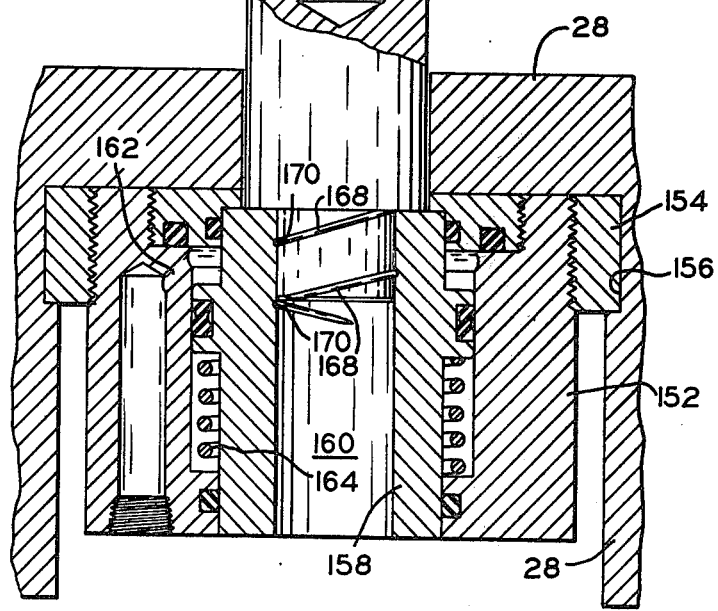
FIG. 11 is a sectional view of a modified form of the present invention.

Another embodiment of the present invention is shown in FIGS. 11 and 12 and comprises a cylinder 152 threadedly attached to elongated plate 154, the latter being received within a T-slot 156 in table 28. A piston 158 is reciprocably received in cylinder 152 and includes a cylindrical bore 160 extending therethrough. Piston 158 is retracted by the application of fluid pressure through passageway 162 and is urged to its upward position (FIG. 11) by compressed spring 164. With the exception of the configuration of bore 160, the device shown in FIG. 11 is virtually identical to that shown in FIG. 6.

In this embodiment, the pin 166 is threadedly secured to piston 154 by means of a pair of interrupted high pitch threads 168 which engage with corresponding female threads 170. The pitch of threads 168 and 170 is sufficiently high to enable pin 166 to be tightened within piston 158 with less than a full turn, for example, a quarter turn. Pin 166 includes female threads 172 so as to permit connection of a threaded rod similar to rod 151. If desired, regular, non-interrupted threads may be employed.

Figure 10:
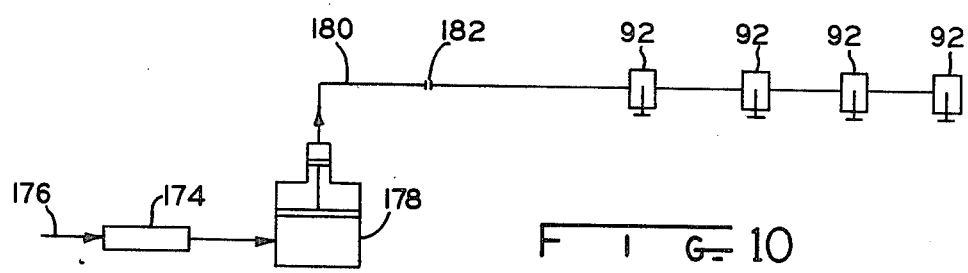
FIG. 10 is a hydraulic schematic for the clamping system of the present invention.

The hydraulic system for the clamping system described is shown schematically in FIG. 10 and comprises a three-way valve 174 connected to a source of pneumatic pressure over line 176, an air over hydraulic booster 178 having a high pressure hydraulic output line 180 which connects with cylinders 92 (or cylinders 152) through quick disconnect coupler 182.

The hydraulic bayonet clamping system described above operates as follows. Fixture 32 is floated on its film of pressurized air to the desired position, accurately located by means of locating pins 70 and then brought to rest on table 28 by interrupting the supply of pneumatic pressure to passageways 36. In the case of the embodiment shown in FIGS. 6–9, pins 128 are inserted through their respective openings 120 and pistons 196 and then turned 90° so as to be locked in place (FIG. 6). Blocks 184 are then set in place and slotted clamping bars 186 are placed over rods 151 and suspended between blocks 184 and fixture 32. Washers 188 are placed over the ends of rods 151 and tightened against clamping bars 186 by nuts 190. Downward pressure on clamping bars 186 is exerted by admitting fluid under pressure into working chamber 108 which urges piston 96 and therefore pin 128 downwardly. If the fixture 32 is to be moved, the above steps are reversed and another pair of piston and cylinders 92, 96 are selected. In order to prevent chips and shavings from collecting in openings 120, they are equipped with covers 192 when not in use.

The embodiment of FIG. 11 operates in a similar fashion to the embodiment just described except that pin 166 is screwed into piston 158. This embodiment has the advantage that a smaller piston and cylinder may be employed.

Figure 16:
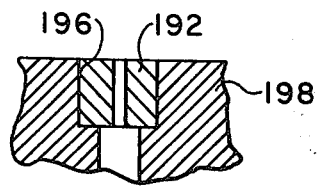
FIG. 16 is a sectional view of one of the covered bayonet clamp openings.
Figure 13:
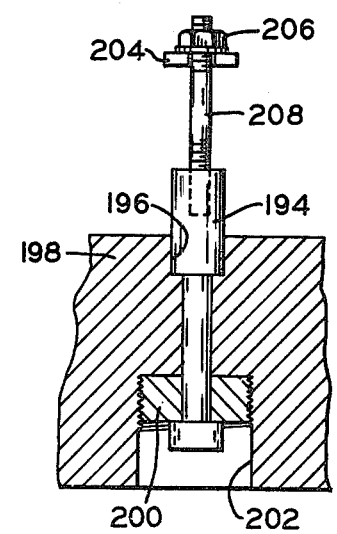
FIG. 13 is a sectional view of a manual clamping device according to the present invention.

A manual clamping embodiment is shown in FIG. 13 and comprises a pin 194 identical to pin 128 received in a stepped opening 196 in table 198. The female element 200, which has an internal horizontal section similar to piston 96, is threaded into a downwardly facing bore 202 in table 198. Clamping bar 204 is pulled downwardly by tightening nut 206 on threaded rod 208, which is in turn threadedly connected to pin 194. An unused bayonet opening 196 is shown closed by a cover 192 in FIG. 16.

Figure 14:
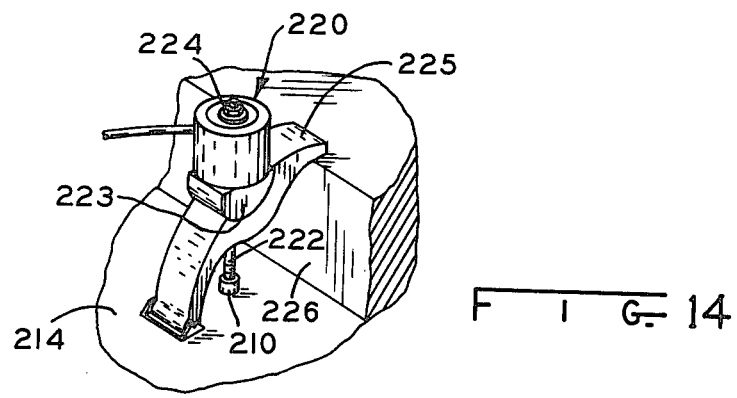
FIGS. 14 and 15 are perspective and sectional views respectively, and of a modified form of the present invention.
Figure 15:
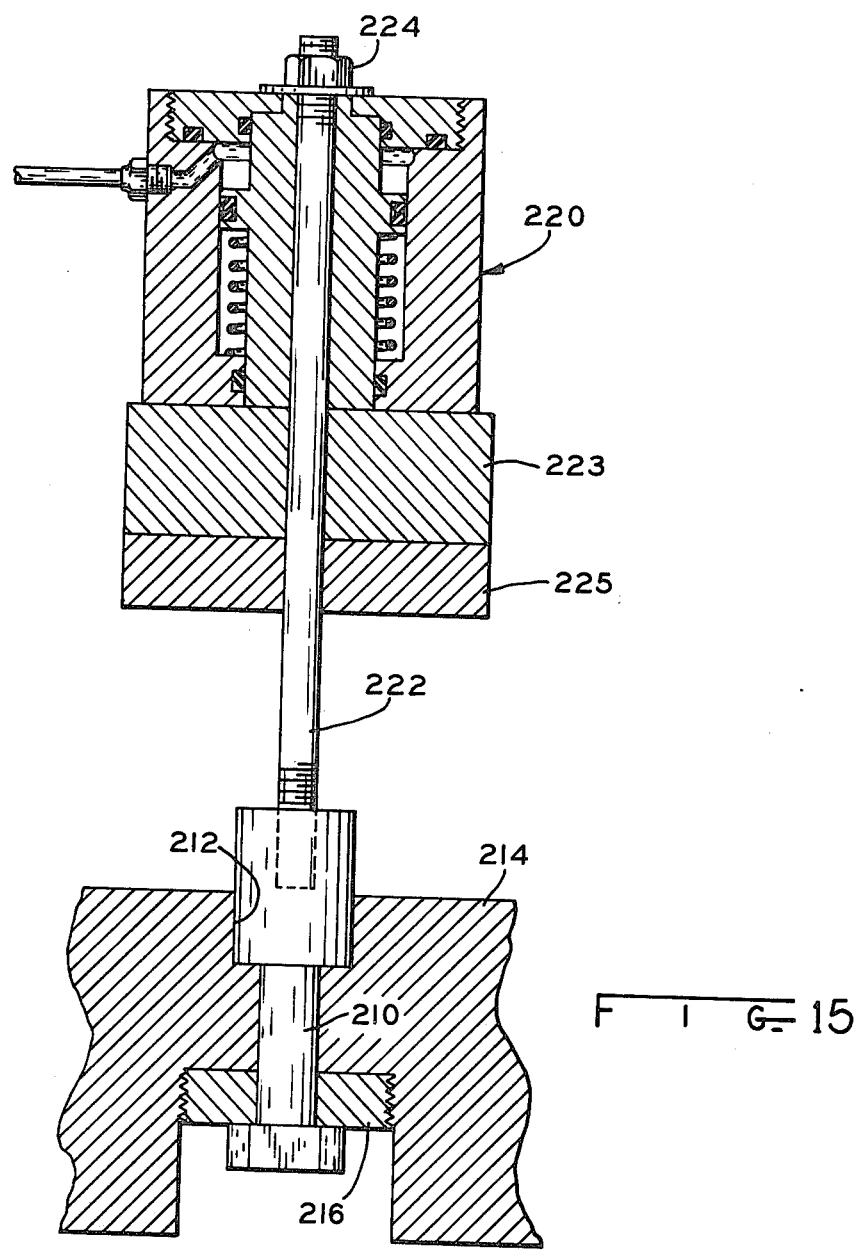

A further modification to the present invention is illustrated in FIGS. 14 and 15 and comprises a pin 210 similar to pin 194 received in a stepped opening 212 in table 214. The female element 216 is similar to element 200 and threaded into bore 218 and engages the end of pin 210. Hydraulic cylinder 220, which is similar to the one shown in FIGS. 6 and 11, is received over rod 222 between nut 224 and clamping bar 225 and spacer 223. When energized, cylinder 220 exerts downward force on bar 225 through spacer 223 so as to clamp a workpiece 226 as shown in FIG. 14. All of the clamps are preferably energized simultaneously.

While this invention has been described as having a preferred design, it will be understood that it is capable of further modification. This application is, therefore, intended to cover any variations, uses, or adaptations of the invention following the general principles thereof including such departures from the present disclosure as come within known or customary practice in the art to which this invention pertains, and as may be applied to the essential features hereinbefore set forth and fall within the scope of this invention.

What is claimed is:

1. Apparatus for clamping a workpiece or workpiece fixture in a machine tool comprising:
   a table having a surface adapted to support a workpiece or workpiece fixture thereon,
   a fluid actuator including a piston and cylinder mounted within said table beneath said table surface, one of said piston or cylinder being stationarily secured to said table, and the other of said piston or cylinder being fluid actuated,
   a plurality of openings in said table surface through which said fluid actuator is accessible,
   a plurality of removable covers for covering selected said openings,
   a clamp element removably received in one of said openings for sliding movement in a direction generally normal to said table surface,
   means for selectively mechanically interlocking said clamp element with said the other of said piston or cylinder whereby when said fluid actuator is actuated, said clamp element will slide in said opening, and
   means on said clamp element for engaging a workpiece or workpiece fixture in a manner to enable clamping of same to said table when said clamp element is drawn toward said table by said fluid actuator.

2. The apparatus of claim 1 wherein said clamp element comprises a pin and said means for mechanically interlocking includes a bore in said the other of said piston or cylinder and lug means on said pin adapted to be inserted into said bore and interlock with said the other of said piston or cylinder when said pin is turned.

3. The apparatus of claim 1 wherein said clamp element is a pin and said means for mechanically interlocking includes high pitch threads on said pin and a correspondingly threaded socket in said the other of said piston or cylinder.

4. The apparatus of claim 1 including a slot in said table positioned beneath and parallel to said table surface, and a mounting plate slidably received in said slot, at least some of said fluid actuators being mounted in said plate, said plate and said some of said fluid actuators being movable from said table as a unit.

5. Apparatus for clamping a workpiece or workpiece fixture in a machine tool comprising:
   a table having a surface adapted to support a workpiece or workpiece fixture thereon,
   a plurality of openings in said table,
   removable cover means for covering selected ones of said openings,
   a plurality of threaded sockets respectively mounted in said table below and accessible through said openings,
   a connecting element adapted to be removably inserted in a selected said opening and having interrupted high pitch threads thereon engageable with the threads of the respective socket,
   a clamp element connected to said connecting element adapted to engage a workpiece or workpiece fixture supported on said table surface, and
   means for drawing said clamp element toward said connecting element whereby a workpiece or workpiece fixture supported on the table and engaged by the clamp element will be clamped therebetween.

6. Apparatus for clamping a workpiece or workpiece fixture in a machine tool comprising:
   a table having a surface adapted to support a workpiece or workpiece fixture thereon,
   a plurality of openings in said table,
   removable cover means for covering selected ones of said openings,
   a plurality of first clamp elements within said table respectively below and accessible through said openings,
   a second clamp element adapted to be removably inserted in a selected said opening and including means for selectively, mechanically interlocking with the first clamp element mounted below the selected opening, said means for interlocking comprising a bore in each of said first elements in alignment with its respective said opening, and a lug means on said second element adapted to be inserted through said bore and to interlock with said first element when said second element is turned in said opening,
   a third element on said second clamp element adapted to engage a workpiece or workpiece fixture supported on said table surface, and
   means for drawing said third element towards said table surface whereby a workpiece or fixture supported on said table and engaged by said third element will be clamped therebetween.

7. The apparatus of claim 6 wherein:
   said bore has a long dimension and a short dimension each generally parallel to said table surface,
   said lug means has a long dimension and a short dimension each generally parallel to said table surface when positioned in said opening,
   said lug long and short dimensions are less than or equal to said bore long and short dimensions, respectively, and said lug long dimension is greater than said bore short dimension.

8. The apparatus of claim 6 wherein said means for drawing said third element towards said table includes a power actuator operatively connected to said first element.

9. The apparatus of claim 8 wherein said means for drawing said third element includes a fluid actuated piston.

10. Apparatus for clamping a workpiece or workpiece fixture in a machine tool comprising:
    a table having a surface adapted to support a workpiece or a workpiece fixture thereon,
    a plurality of openings in said table,
    removable cover means for covering selected ones of said openings,
    a plurality of first clamp elements mounted within said table respectively below and accessible through said openings,
    a second clamp element adapted to be removably inserted in a selected said opening and including means for selectively, mechanically interlocking with the first clamp element mounted below the selected opening, a third element on said second clamp element adapted to engage a workpiece or workpiece fixture supported on said table surface, and power actuator means engaging said third element from above for drawing said third element toward said table surface whereby a workpiece or fixture supported on said table and engaged by said third element will be clamped therebetween.

11. Apparatus for clamping a workpiece or workpiece fixture in a machine tool comprising:

a table having a surface adapted to support a workpiece or workpiece fixture thereon, a plurality of openings in said table, removable cover means for covering selected ones of said openings, a plurality of first clamp elements within said table respectively below and accessible through said openings, a second clamp element adapted to be removably inserted in a selected said opening and including means for selectively, mechanically interlocking with the first clamp element mounted below the selected opening, said means for interlocking comprising a bore in each of said first elements in alignment with its respective said opening, and a lug means on said second element adapted to be inserted through said bore and to interlock with said first element when said second element is turned in said opening, a third element on said second clamp element adapted to engage a workpiece or workpiece fixture supported on said table surface, means for drawing said third element towards said table surface whereby a workpiece of fixture supported on said table and engaged by said third element will be clamped therebetween, a workpiece fixture supported on said table, said fixture having a downwardly facing lower surface, and means for supplying pneumatic pressure between said table and fixture surfaces for floatingly supporting said fixture on said table to permit free movement of the fixture thereon.

12. Apparatus for clamping a workpiece or workpiece fixture in a machine tool comprising:

a table having a surface adapted to support a workpiece or workpiece fixture thereon, a plurality of openings in said table, removable cover means for covering selected ones of said openings, said cover means being one of substantially flush with or slightly below said table surface when in place, a plurality of first clamp elements being mounted within said table respectively below and accessible through said openings, a second clamp element adapted to be removably inserted in a selected said opening and including means for selectively, mechanically interlocking with the first clamp element mounted below the selected opening, a third element on said second clamp element adapted to engage a workpiece or workpiece fixture supported on said table surface, and means for drawing said third element toward said table surface whereby a workpiece or workpiece fixture supported on said table and engaged by said third element will be clamped therebetween.

13. Apparatus for clamping a workpiece or workpiece fixture in a machine tool comprising:

a table having a surface adapted to support a workpiece or workpiece fixture thereon, a fluid actuator including a piston and cylinder mounted within said table beneath said table surface, one of said piston or cylinder being stationarily secured to said table, and the other of said piston or cylinder being fluid actuated, an opening in said table surface through which said fluid actuator is accessible, a pin removably received in said opening for sliding movement in a direction generally normal to said table surface, means for selectively mechanically interlocking said pin with said the other of said piston or cylinder whereby when said fluid actuator is actuated, said clamp will slide in said opening, said means for mechanically interlocking including a bore in said the other of said piston or cylinder and lug means on said pin adapted to be inserted into said bore and interlock with said the other of said piston or cylinder when said pin is turned, and means of said clamp element for engaging a workpiece or workpiece fixture in a manner to enable clamping of same to said table when said clamp element is drawn toward said table by said fluid actuator.

14. The apparatus of claim 10 wherein said third element includes a pin extending upwardly from said table and a clamp bar adapted to engage a workpiece or fixture, and said power actuator is a hydraulic cylinder device received over said rod and in engagement with said clamp bar.

* * * * *

UNITED STATES PATENT AND TRADEMARK OFFICE
CERTIFICATE OF CORRECTION

PATENT NO. : 4,174,828
DATED : November 20, 1979
INVENTOR(S) : RAYMOND A. BERGMAN It is certified that error appears in the above–identified patent and that said Letters Patent are hereby corrected as shown below:

column 2, line 53, change "to" to --in--
    column 5, line 21, change "housing" to --bushing--
    Claim 4, column 7, line 54, change "movable" to --removable--
    Claim 11, column 9, line 35, change "of" to --or--
    Claim 13, column 10, line 41, change "of" to --on--

Signed and Sealed this

First Day of April 1980

[SEAL]

Attest:

SIDNEY A. DIAMOND

Attesting Officer      Commissioner of Patents and Trademarks